United States Patent [19]

d'Achard Van Enschut

[11] Patent Number: 5,700,193
[45] Date of Patent: Dec. 23, 1997

[54] VIRTUAL PINBALL/VIDEO ARCADE GAMES

[75] Inventor: Johannes F. M. d'Achard Van Enschut, Eindhoven, Netherlands

[73] Assignee: U.S. Philips Corporation, New York, N.Y.

[21] Appl. No.: 623,646

[22] Filed: Mar. 28, 1996

[30] Foreign Application Priority Data

Apr. 18, 1995 [EP] European Pat. Off. ............. 95200968

[51] Int. Cl.⁶ ...................................................... A63F 7/24
[52] U.S. Cl. ............................................................ 463/3
[58] Field of Search ................................. 463/2, 3, 5, 30,
463/37, 49, 53, 54, 57; 273/109, 110, 114,
119 R, 121 A

[56] References Cited

U.S. PATENT DOCUMENTS 4,334,679  6/1982  Doyle .......................................... 463/3
4,693,476  9/1987  Talamantez ............................. 273/110

OTHER PUBLICATIONS

Schmalz, "Epic Pinball"—brochure, published by Epic Mega Games, 1993/4, 10406 Holbrook Drive, Potomac, MD 20854.

Primary Examiner—George Manuel
Attorney, Agent, or Firm—Anne E. Barschall

[57] ABSTRACT

For use in multimedia or other environments, a virtual pinball/video arcade game displays one or more computer-generated runner elements, runner inject elements, and runner interactivity elements. It has a programmed computer for simulating movement of the runner elements. This is interfered with by mechanical interactions between said inject and interactivity elements, the simulated movement of the one or more runner elements, and user actions on a user interface. In particular, the computer is furthermore connected to the housing as part of the user interface. A feedback actuator is controlled by the computer for imparting low-frequency primary physical interactions to the housing as a reaction on selected ones of the simulated mechanical interactions.

11 Claims, 4 Drawing Sheets

VIRTUAL PINBALL/VIDEO ARCADE GAMES

BACKGROUND TO THE INVENTION

The invention relates to a virtual pinball/video arcade game comprising housing means with a display field for displaying one or more computer-generated runner elements, runner inject elements, and runner interactivity elements, and furthermore programmed computer means for simulating movement of said one or more runner elements, interfered with by simulated mechanical interactions between said inject and interactivity elements, the simulated movement of said one or more runner elements, and user actions on a user interface. Games according to the preamble have been described in the commercial brochure 'Epic Pinball' by James Schmalz, and published by Epic Mega Games, 1993/4, 10406 Holbrook Drive, Potomac Md., 20854, USA. The brochure contains a brief history of electromechanical pinball games, and also descriptions of various simulation packages for playing pinball-type games on personal computers. In the terminology of the art, a runner is a ball, an inject element is a plunger, and runner interactivity elements come in a wide variety, such as flipper pairs that are moved by the player, live bumpers that give the ball . extra motion upon bumping, holes where the ball vanishes from the play, guides, lanes and ramps, holes with vertical eject, and many others. The actual video representation of these elements may have many forms. Furthermore there is often some kind of display for displaying scores, level of actual skill, and often also a channel for producing sound and music to accompany particular events in the game.

Now in such computer based games, user interaction is mostly limited to button actuation. For example, plunger action is connected to the space bar, whereas the shift keys are used for controlling the flippers. A particular type of interaction that has been in wide use with arcade games is the so-called nudging, which simulates movement of the game table, for so influencing the mechanical motion of the ball. Epic has simulated this in their embodiments by means of the keys z and /, that appear at far left and right, respectively, of a "qwerty" keyboard, and also by the space bar. If the nudging goes too far, a "tilt" simulation is produced by the computer, which simulation probably aborts the game.

Now, the present inventor has experienced a nostalgic longing for the old-day electro-mechanical game, where user-induced mechanical motions of the game housing were an essential element of playing the game. Such motions were intended to influence the movement of the ball, and to some extent, were effective. Regrettably these simulated motions, even if effected, will have only limited influence in present-day personal computer based applications. Moreover, effecting of the nudging by means of the buttons on the keyboard would appear clumsy at best.

SUMMARY TO THE INVENTION

Accordingly, amongst other things, it is an object of the invention to lend modern, pure electronic, versions of these old games a true-to-life character by means of introducing electromechanical means into the world of electronic games, and by means of feedback, enhancing the "look and feel" qualities of the game. Now, according to one of its aspects, the invention is characterized in that said computer means furthermore have detector means connected to said housing means as part of said user interface, and feedback actuator means controlled by said programmed computer means for imparting low-frequency primary physical interactions to said housing means as a reaction on selected ones of said simulated mechanical interactions.

Traditionally, persons have undertaken to move the housing of an electromechanical pinball game for so trying to influence the motion of the runner element or ball, at the risk of producing a tilt situation. The solution according to the present invention renders the now fully electronic game to more resemble the properties of the old electromechanical game. Advantageously, secondary and ternary low-frequency interactions simulate a feedback to the user person moving the housing, both if the 'tilt' threshold has not yet been reached, and also if this threshold has effectively been passed.

The invention also relates to a user interface device for use with a game according to the invention. In particular, the display is arranged for simulating further said physical interactions occurring. It has been found that this lends the game an even more lively character. Advantageously, the display is arranged for viewing by a synchronously operated alternating field transmittive pair of glasses. In this way, alternating TV frames are visible to the left and right human eye, respectively, for even more approaching virtual reality. Further advantageous aspects of the invention are recited in dependent Claims.

BRIEF DESCRIPTION OF THE DRAWING

These and other aspects and advantages of the invention will be described more in detail hereinafter with reference to preferred embodiments, and more in particular with reference to the appended Figures that show.

DETAILED DESCRIPTION OF PREFERRED EMBODIMENTS

Figure 1:
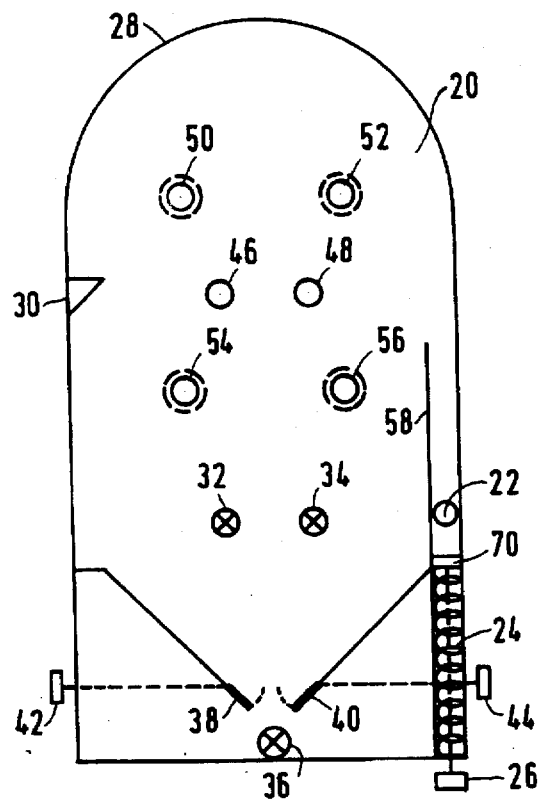
FIG. 1, a diagram of a conventional pinball machine.

FIG. 1 is a block diagram of a conventional pinball machine. Such game may be conventionally realized by electromechanical technology, as follows: the overall game has the form of a shallow rectangular box 20 with a glass lid. The box is inclined over a small angle that for example can be in the range of 2–5 degrees. One end of the box has a semi-circular shape 28. Under insertion of a coin, the game injects a bail through injector 22, which "falls" against the plunger 70. Through pulling the plunger button 26 against the force of coiled spring 24, the bail may roll further back. Release of the button will send the ball up and then along semi-circle 28. It may or may not reach final stop 30. Without user interaction, the ball will eventually roll to terminal hole 36 and then vanish from sight. Alternatively, the user by means of moving the flippers 38, 40, through respectively associated buttons 42, 44, may try to give the approaching ball a renewed impetus away from the terminal hole 36 to prolong the game. Furthermore, the ball may hit dead bumpers 46, 48 and change its course of motion. Also, the ball may hit living bumpers 50, 52, 54, 56, which may impart a repulsive impetus to the ball to thereby raise its speed. Finally, further terminal holes 54, 56 may have the same function as terminal hole 36.

The art of playing this type of game is directed to keep the ball in the game as long as possible. Various events may give rise to increase the player's score, such as hitting living or dead bumpers, or reaching a particular terminal hole. Also, certain events may influence the outcome of subsequent events, such as raising the score relating to a particular bumper. The popularity of successive generations of such games have been based on new gadgets, particular programming, audio-visual extras, and styling. In addition to operating the flipper buttons, users have tried to influence the ball motion by moving the housing of the game. For example, a ball may waver on bumper 46 between going left and going right. Going left means hitting living bumper 54 and getting the associated score, and probably also a new move upwards. Going right means a long move towards terminal hole 36, and possibly the end of the game, if moving the flippers fails to throw the ball upwards. The user person may thus try to influence the ball's path. It has been found that the housing of an electromechanical game should be able to move a little bit. A tilt detector has conventionally been added to detect extraneous motions effected by the user, that could influence the outcome of the game in an unwanted manner, or even damage the whole set-up.

Figure 2:
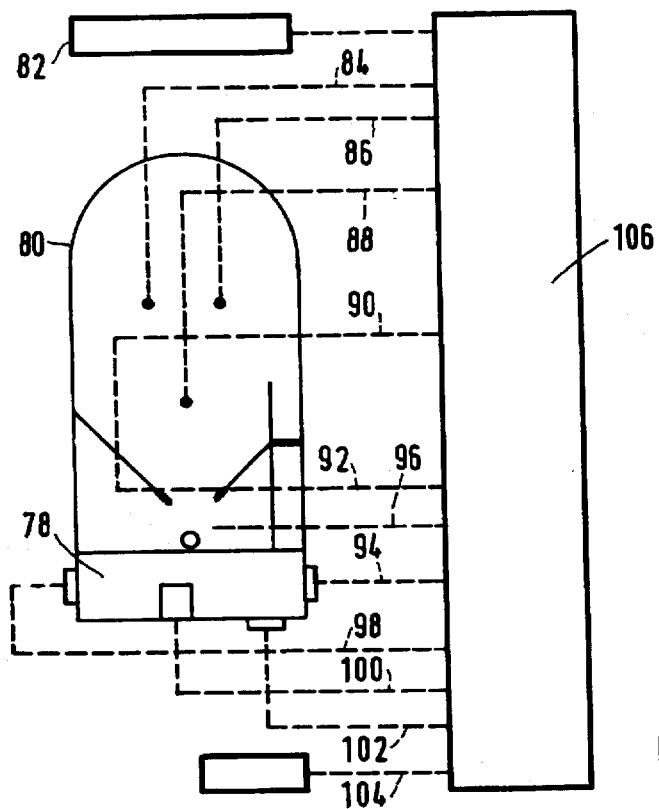
FIG. 2, a diagram of a comprehensive version thereof.

The game as described, of which only a very elementary outline has been sketched up to now, may be translated to a purely digital electronic realization, wherein a PC type display is used with its associated keyboard and sound channel. In this respect, FIG. 2 is a diagram of a comprehensive version according to the invention. The principal element is computer 106, which displays a simulated game field 80, in which plunger, bumpers, flippers and terminal holes have been indicated in a schematic manner. Also the ball is displayed (not shown) along with its moving on the field and its interference with the various other elements. The equations of the ball motion, including its gravity component through the simulated inclination of the field, are stored in the computer and the position of the ball is computed and displayed many times per second. Also the display of the various display elements is controlled along lines 84, 86, 88, 90, 92, 96. In fact, the display may be a conventional LCD field, of which the orientation may in principle have an arbitrary value. Alternative realizations are by picture tube or projection T.V. In consequence the positions of the displayed elements, and hence the various control lines that may be either hard wires of soft connections, will relate to particular addresses in the display memory. The game score is displayed in a display 82 that is connected to the computer. The latter display may be part of the main display field. The game has a user interface with three buttons for left and right flippers and plunger, respectively, that are connected to the computer by means of connections 98, 94, and 102, respectively, for feeding the computer with control signals. The electromechanical versions of the game have already featured additional buttons, such as for controlling a second pair of flippers, as well as a button for controlling the start of a new game.

Furthermore, the user interface has a motion detector/transducer that is connected to the computer via line 100. Moving the interface housing may give a signal to the computer. By itself, motion detectors have been in common use for signalization and feedback purposes. Now, if the imparted motion is below a particular level, it is translated into a term in the equation of motion of the ball, and a dynamic shifting of the displayed image in the intended direction. For example, when wavering on a dead bumper, instantaneous movement of the housing may be translated into a motion component of the ball of equal magnitude, but of opposite sign. Moreover, the transducer gets a control signal from the computer in such a way as to simulate a mechanical shudder of the housing and/or the display. The frequency and intensity should be chosen for appropriate effect on a person: 0.3 Hz to 10 Hz is expected to be an effective frequency range. The amplitude may be from a fraction of a millimeter to several millimeters peak-to-peak. If the user-imparted motion is however above a particular level, the transducer may give a more severe signal, and also the display may give a tilt signalization. This instantaneously terminates the game. The low-frequency transducer may for example be one ore more low-frequency loudspeakers, such as a so-called woofer, or in general, any applicable electromechanical actuator. The signalization to the user person is then through the person's hands which presumably to a great deal rest on the user interface box 78. Line 104 connects a sound output mechanism to the computer. This may also give a low frequency warning to the user person under control of the motion detector. If required, various switches and contacts in the device may be exchanged for force-proportional components. In a more elementary realization, the low-frequency physical interactions are generated even without an input from the motion detector, but directly as a reaction of certain interactions in the game.

In the above, the packaging may have various forms. In the first, the personal computer is used as far as possible, so that the display is the standard computer display, the buttons are standard keyboard buttons, and the sound output is by a soundblaster card. The plunger force is adjusted by the duration of actuation of the plunger button. The movement imparted by the user then is the moving of the keyboard itself, or more general, of the input device, in case of force activation.

Figure 3:
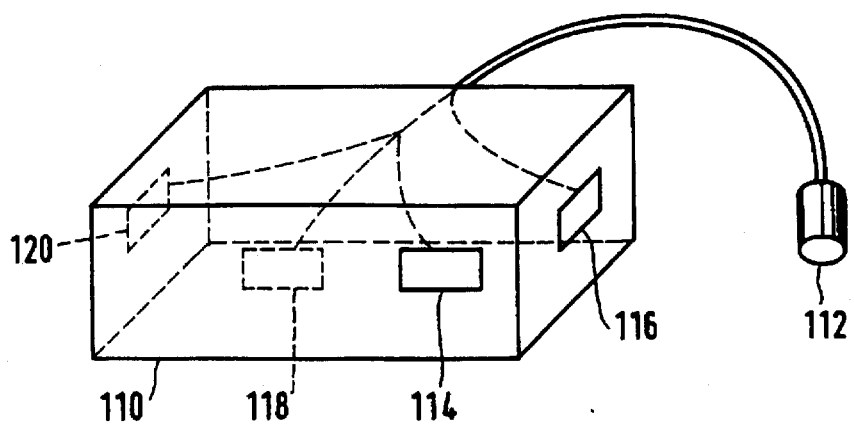
FIG. 3, a user interface device for use in the invention.

In the second realization, the mechanical user interface is a special element, but both the computer and the display are standard PC-like facilities. FIG. 3 is such a user interface device for use in the invention. Box 110 may be 30 centimeters wide, 10 centimeters deep, and 10 centimeters high. It has left hand flipper button 120, right hand flipper button 116, plunger button 114, and tether cable 112. Motion detector-transducer 118 sits invisibly within the housing. It may be sensitive for particular directions of motion, such as left-right and forward-backward, separately. By itself, motion detectors are conventional elements. Inside the computer, the motion detection signal is analyzed and compared with various threshold levels. The levels may be different in the various directions. The motion vector is then used for controlling the ball motion. If the motion imparted to the keyboard or, more generally, to the user interface representative elements, surpasses a particular threshold, various danger signals may be produced, such as may be consummate to the nature of the game, such as thunder, or even lower frequency sounds that remain unheard. Preferredly, the vibrations are transversal, as experienced by a user. If the imparted motion is still more intensive, the tilt threshold may be passed, which instantly stops the game, under presentation of further clue signals to the user.

Summarizing, the invention provides for low-frequency feedback signals to the user. The actual cause of the feedback signal may be the movement of the runner, such as its impact on a bumper element. Another cause of the motion may be feedback from the motion that the user person undertakes to impart to the housing and in consequence, to the runner element.

Figure 4:
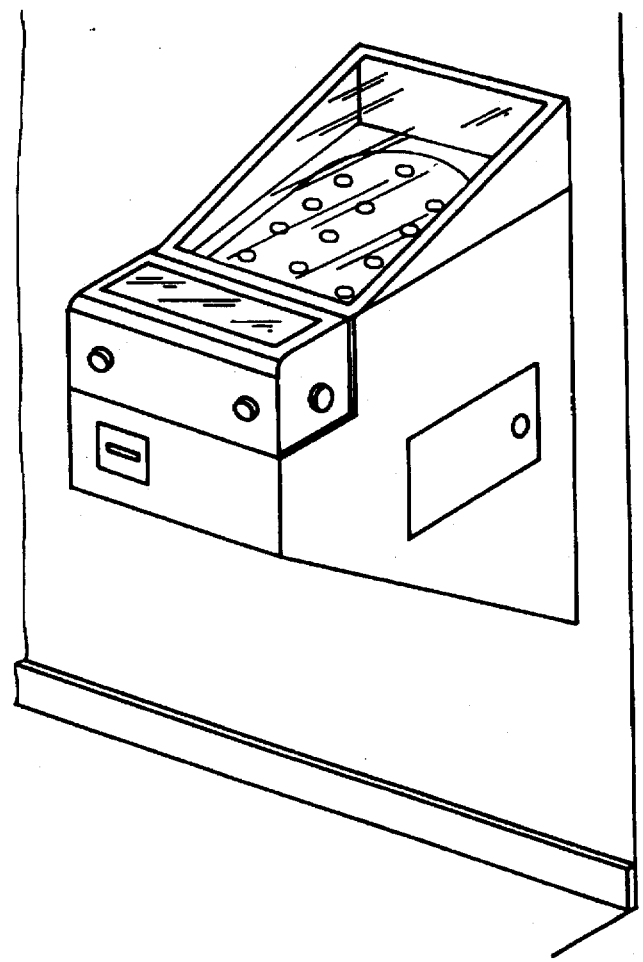
FIG. 4, an artist's impression of a first embodiment.

FIG. 4 gives an artist's impression of a first embodiment of the invention. The embodiment is a rather simple pinball machine, provided with a big display for the game itself, a control box at the front end, provided with plunger control and flipper control buttons, a coin slot, and a general supporting structure. The inclination angle of the display may be limited to a few degrees, but another range of values would be feasible as well. Artificial gravity could in principle be combined with a horizontal playing field. The score display may be effected on the main display field. The computer may, or may not be integrated in the supporting structure.

Figure 5:
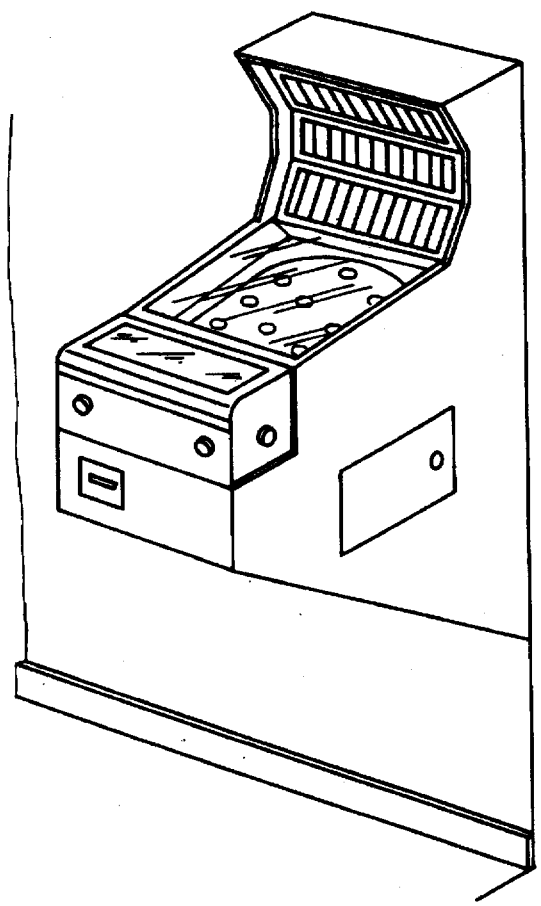
FIG. 5, an artist's impression of a second embodiment.

FIG. 5 gives an artist's impression of a second embodiment of the invention. Here, the pinball machine is more elaborated, in that a separate display arrangement is placed above the standard playing field. The internal facilities of the two versions may be largely identical.

Figure 6:
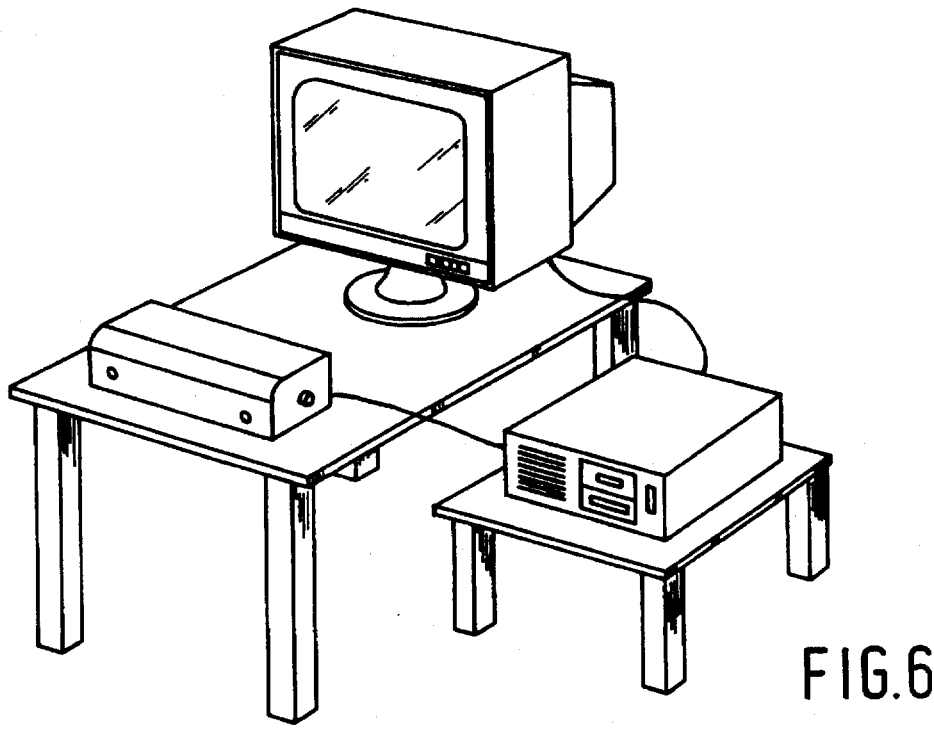
FIG. 6, an artist's impression of a third embodiment.

FIG. 6 gives an artist's impression of a third embodiment of the invention. Here, the hardware is PC-based. As shown, the system has a PC display, a PC processor, and a control unit according to the general embodiment of FIG. 3.

Figure 7:
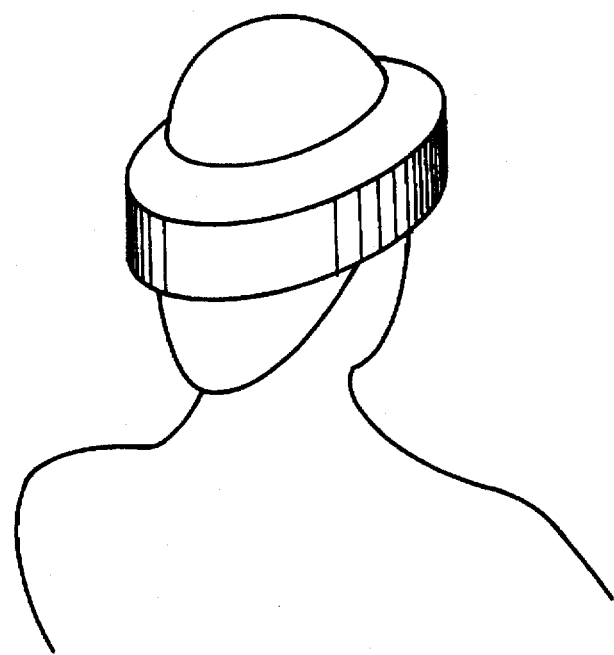
FIG. 7, an artist's impression of a viewer helmet.

FIG. 7 gives an artist's impression of a viewer helmet that is generally shown from the rear side of the user's head. The prime element of the helmet in the context of the present invention is a structure containing transmission elements for each of the user person's eyes. The elements are transmissive or not, in accordance with the reception of a control signal. Various technological solutions are feasible, inter alia by LCD. The non-transmittive state effects a dispersion of the incident light. Furthermore, the helmet may or may not contain loudspeakers or "head phones".

Figure 8:
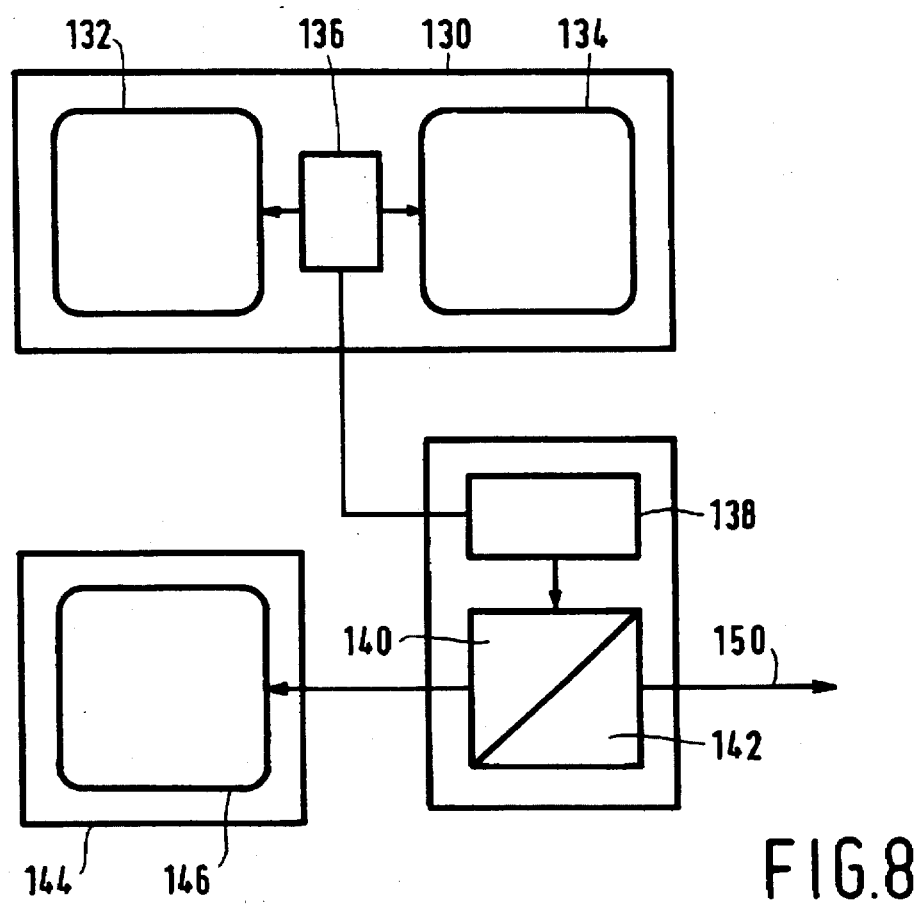
FIG. 8, a control arrangement for the Claims:viewer helmet.

FIG. 8 shows a control arrangement for the viewer helmet. The helmet structure is symbolized by block 130, which for each eye of the user has a transmission element 132, 134, according to an appropriate geometrical configuration. The transmission control signal is applied by control element 136 in such a way that the transmission of the elements is controlled periodically with mutually opposite phases. The game display field is symbolized by structure 144 having an actual display field 146. The display is effected from a memory that stores alternate frames 140, 142, under control from synchronization element 138, that interacts with control element. In this manner, the organization may be such that for example the user's left eye sees only the 'odd' frames, whereas the right eye sees only the 'even' frames. In this manner, a shuddering display movement, as well as a stereoscopic effect can be invoked, both of which induce a three-dimensional aspect of the display. By itself, the use of stereoscopic effects in the representation of movies has been well-documented, allowing its extended use as suggested supra. All these effects can be simulated in synchronization with the physical movement imparted to the control box. Line 150 connects to the processor for updating the display.

Various further extensions can be envisioned to the invention. According to a first one, part or whole of the display is replaced by video-images. These may be replayed from a recording medium, reconstructed by computer animation, or even be a live reproduction by a camera, such as one being directed on the user person's head.

According to an other extension, a smart card is used for taking over actual scores, for returning old scores, and for storing levels of skill attained, preferred settings, and others. The settings may refer to various aspects, such as sound level, exposure level of a camera being integrated in the system, and others.

According to a third extension, the game may be based on networking with other games and/or players. This may lead to various levels of interaction, such as:
competitive playing at remote sites, where even one player may try to influence another's game, through the motion detector;
a jackpot hit at one game may give other players "the jitters".

Various other features lay open to the skilled art practitioner to extend the game according to the invention.

I claim:

1. A virtual pinball/video arcade game comprising housing means with a display field for displaying one or more computer-generated runner elements, runner inject elements, and runner interactivity elements, and furthermore programmed computer means for simulating movement of said one or more runner elements interfered with by simulated mechanical interactions between said inject and interactivity elements, the simulated movement of said one or more runner elements, and user actions on a user interface,
characterized in that said computer means furthermore have feedback actuator means controlled by said programmed computer means for imparting low-frequency primary physical interactions to said housing means as a reaction on selected ones of said simulated mechanical interactions.

2. A game as claimed in claim 1, characterized in that said computer means furthermore have detector means connected to said housing means for detecting motion of said housing means and generating a further said mechanical interaction signal, as part of said user interface, and said feedback actuator means are arranged for simulating by means of secondary low-frequency physical interactions a feedback to said user person moving said housing means, failing an actual tilt situation evolving.

3. A game as claimed in claim 2, wherein ternary low-frequency physical interactions simulate a feedback to said user person moving said housing means for so simulating a tilt situation.

4. A user interface element for use with a game as claimed in claim 1, comprising a housing and attachment means for bidirectional attaching to programmed computer means for therein running a virtual pinball/video arcade game program simulating one or more computer-generated runner elements, runner inject elements, and runner interactivity elements, while controlling movement of said runner elements interfered with by simulated mechanical interactions between said inject and interactivity elements, simulated movement of said runner elements, and user actions on a user interface element,
characterized in that said user interface element furthermore has detector means connected to said housing as part of said user interface, and feedback actuator means controllable by said programmed computer means for imparting low-frequency primary physical interactions to said housing as a reaction on selected ones of said simulated mechanical interactions.

5. A user interface element as claimed in claim 4, wherein secondary low-frequency physical interactions simulate a feedback to said user person moving said housing, failing an actual tilt situation evolving.

6. A user interface element as claimed in claim 4, wherein ternary low-frequency physical interactions simulate a feedback to said user person moving said housing for so simulating a tilt situation.

7. A user interface element as claimed in claim 4, wherein said attachment means allow for receiving video signals produced by said computer means for displaying a game field on a display field privy to said housing.

8. A user interface element or game according to claim 1, wherein said display is arranged for simulating further said physical interactions occurring.

9. A user interface element or game according to claim 8, wherein the display is arranged for viewing by a synchronously operated alternating field transmittive pair of glasses.

10. A user interface as claimed in claim 9, wherein said display allows for stereoscopic and/or three-dimensional viewing.

11. A user interface element for use in virtual pinball/ video arcade game environments, comprising a housing and attachment means for bidirectional attaching to programmed computer means and furthermore having user input elements, characterized in that said user interface element has furthermore detector means connected to said housing for detecting user-effected mechanical motions of said housing as non-directed to said user input elements, a convertor fed by said detector means for conditionally to said motions generating a detector signal on said attachment means, said user interface element furthermore having feedback activator means connected to said housing for selectively imparting a repertoire of low-frequency motions to said housing under control of control signals received on said attachment means.

* * * * *